Aug. 9, 1955 V. W. BALZER 2,715,152
SEALED CONTAINER
Filed June 18, 1951
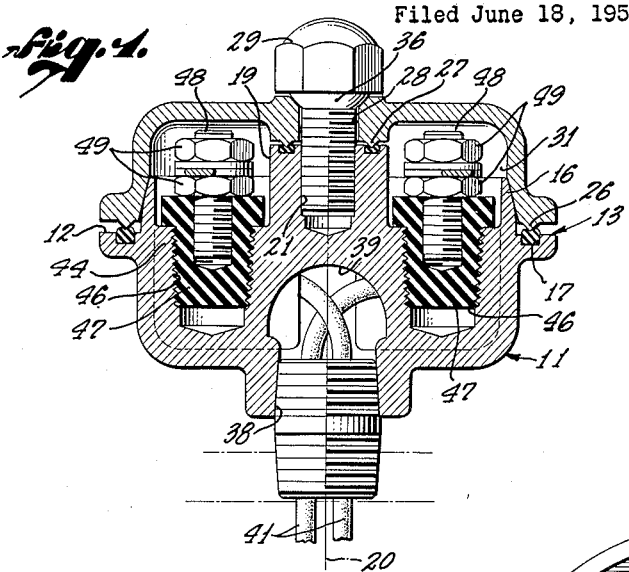
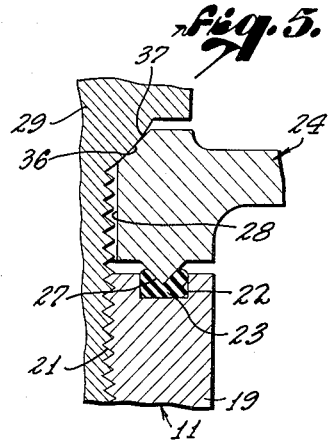
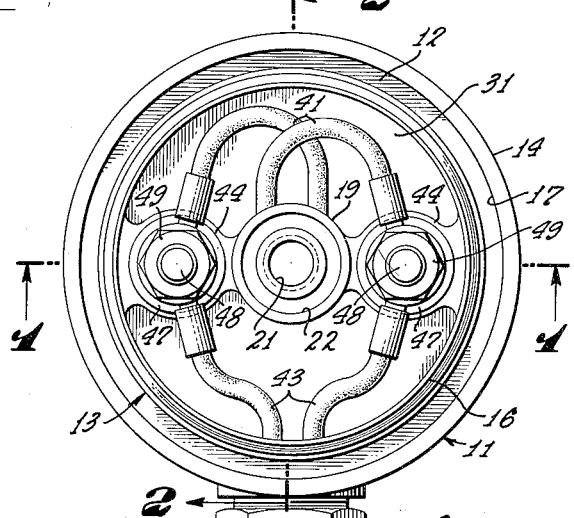
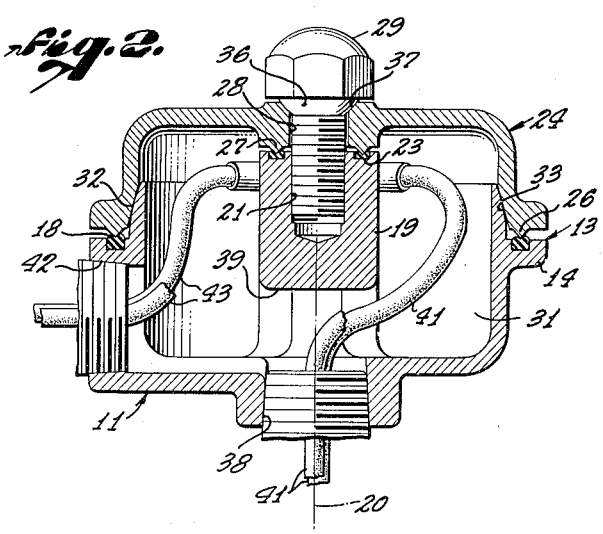
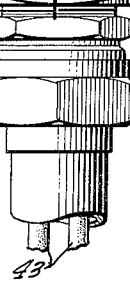
VERNON W. BALZER,
INVENTOR.
HUEBNER, BEEHLER,
WORREL & HERZIG,
ATTORNEYS.
BY Warren T. Jessup United States Patent Office 2,715,152
Patented Aug. 9, 1955

2,715,152

SEALED CONTAINER

Vernon W. Balzer, Van Nuys, Calif., assignor to Hallett Manufacturing Company, Inglewood, Calif., a corporation of California Application June 18, 1951, Serial No. 232,224

2 Claims. (Cl. 174—59)

This invention relates to sealed containers, and has particular reference to an electrical junction box whose cover or cap forms a simple yet effective seal for the container, both electrically and with respect to water leakage.

It is an object of this invention to provide a container capable of being sealed in a simple and effective manner against leakage of water thereinto.

It is a further object of this invention to provide such a container as also constitutes a good electrical shield around electrical apparatus in the container.

It is a further object of this invention to provide a sealed container having a single and simple securing means capable of effecting positive securement of the container cap while still providing effective water sealing and electrical shielding of the container cap and the container housing.

In accordance with these and other objects which will become apparent in the ensuing specification, a preferred form of the instant invention will now be described with reference to the accompanying drawing wherein:

Fig. 1 is a vertical cross-section of an electrical junction box embodying the instant invention and taken on line 1—1 of Fig. 3.

Fig. 2 is a vertical cross-section taken at right angles to Fig. 1 as shown by line 2—2 in Fig. 3.

Fig. 3 is a plan view of the junction box with the cap removed.

Fig. 4 is a fragmentary enlargement in the same plane as Fig. 1, showing the outer sealing means in detail.

Fig. 5 is an enlarged fragmentary section taken in the same plane as Fig. 1, showing the inner sealing means in detail.

The container of the instant invention comprises a housing 11 having an open face 12 as seen in Fig. 3. Circumjacent the open face 12 of the housing 11 is a rim 13 formed of a flange portion 14 and a cylindrical portion 16. The rim flange 14 has an annular groove 17 faced in the direction of the open face 12 into which is fitted an outer annular sealing means in the form of a rubber O ring 18.

The housing 11 has an axial or central portion in the form of a boss 19 extending from the bottom of the housing 11 toward the open face 12. The boss 19 is on the axis 20 of the substantially cylindrical housing 11, and is provided with a threaded axial bore 21. Circumjacent the bore 21 is a coaxial annular groove 22, in which is seated an inner annular sealing means in the form of a rubber O ring 23.

A cap 24 is disposed over the open face 12 and has a sharp outer ridge 26 pressed into engagement with the O ring 18 on the rim flange 14, and a sharp inner ridge 27 pressed into engagement with the O ring 23. A central axial hole 28 in the cap 24 provides passage for a securing bolt 29 threaded into the bore 21 of the boss 19. When the bolt is screwed down tight, the cap 24 is pressed into firm sealing engagement with the housing 11 at two places. These two places are: the outer annulus, where the ridge 26 presses into the O ring 18; and the inner annulus, where the ridge 27 presses into the O ring 23. In this manner the annular space 31 within the housing 11 and cap 24 is effectively sealed against the leakage of water thereinto.

In order to provide good electrical shielding as well as weather sealing at the inner and outer annuli, the cylindrical portion 16 of the housing rim 13 has its outer surface 32 (Fig. 4) formed as a portion of a sphere centered on the axis 20 of the housing 11. The complementary, engaging inner portion 33 of the cap 24 is formed as a portion of a conical surface of axis coinciding with the housing axis 20. In this way a certain universality of seating of the cap 24 on the housing 11 is made possible; so that the cap 24, when drawn into firm engagement with the housing 11 by the bolt 29, is enabled to adjust itself so as to provide a good and continuous annular electrical contact between the surfaces 32 and 33.

A similar universality is provided with respect to the inner annular engagement between the cap 24 and the bolt 29. As seen in Fig. 5 a portion 36 of the under surface of the head of the bolt 29 is formed as a portion of a sphere centered on the axis 20. The complementary, engaging portion on the cap 24, circumjacent the hole 28 in the cap, is formed as a portion of a conical surface of axis coinciding with the housing axis 20, as shown at 37 in Fig. 5. Thus, both at the outer and inner annular shielding and sealing areas, there is universality of contact with the cap 24, thereby providing continuous annular electrical contact, and precluding electrical leakage from the interior 31 of the housing.

As the bolt 29 is tightened into the boss 19, the surface 36 bears against the surface 37 to press the cap 24 into sealing engagement with the two O rings 23 and 18 mounted in the housing. The advance of the outer periphery of the cap 24 is limited by the metal-to-metal engagement between the conical surface 33 of the cap 24 and the spherical surface 32 of the housing rim portion 16.

The preferred employment of the instant container is as an electrical junction box; and to that end an axial opening 38 is formed in the bottom of the housing 11 extending slightly into the body of the boss 19. A transverse, tunnel-like opening 39 is formed through the base of the boss 19 communicating with the opening 38, so that electrical wires 41 may be brought into the space 31 through the bottom of the housing 11. Another aperture 42 is formed in the side wall of the housing 11, through which other electrical wires 43 may be brought into the space 31.

Spanning the space between the boss 19 and the wall of the housing 11 are a pair of diametric bridge portions 44 drilled and tapped at 46 to receive insulated bushings 47. Terminal bolts 48 are threaded into the bushings 47, and on them are threaded nuts 49 for clamping together the contacting ends of the wires 41 and 43.

The access apertures or openings 38 and 42 into the body of the housing 11 do not constitute any sealing or shielding problem, since they are more or less permanently installed and may be readily formed as effective seals. The major problem is the shielding and sealing of the cap, which must be so constructed that ready access to the interior of the housing 11 is made possible. This objective is very effectively achieved by the instant invention, which in addition embodies utmost simplicity, since only a single, ordinary bolt is required to effectively clamp the cap 24 to the housing 11 with maximum shielding and sealing for the interior 31 of the housing.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus, and articles.

What is claimed is:

1. A sealed container comprising a generally cylindrical housing having an open face with a circumjacent rim, a continuous annular portion of said housing rim being formed as a portion of a spherical surface centered on the axis of said housing, said housing having a boss extending from the bottom thereof toward said open face, outer annular sealing means on said housing rim, inner annular sealing means on said boss, a cap disposed over said open face and engaging said sealing means to seal said housing closed, a continuous annular portion of said cap being formed as a portion of a conical surface of axis coinciding with said housing axis, said conical portion of said cap annularly engaging said spherical portion of said housing rim to effect a complete electrical seal or contact around said housing between said housing rim and said cap, and a bolt passing through said cap and through said inner annular sealing means and threaded into said boss.

2. An electrical junction box comprising a circular housing having an axis, one face of said housing being open on a plane substantially normal to said axis and having a circumjacent circular rim, a continuous annular portion of said rim being formed as a portion of a spherical surface centered on the axis of said housing, said housing having an electrical conductor aperture located on said axis, first annular sealing means on said rim, second annular sealing means on another portion of said housing circumjacent said axis, a circular cap disposed over said open face and engaging said first and second sealing means to seal said housing closed, said cap having a continuous annular inner portion formed as a portion of a conical surface of axis coincident with said housing axis, said conical portion of said cap annularly engaging said spherical portion of said housing rim to effect a complete electrical contact around said housing between said housing and said cap, an axial bolt passing through said cap and said second annular sealing means and threaded into said housing to secure said cap to said housing, a portion of said bolt being formed as a portion of a spherical surface centered on said axis, a continuous annular portion of said cap through which said bolt passes being formed as a portion of a conical surface of axis coincident with said housing axis, said spherical portion of said bolt annularly engaging said conical portion of said cap opening to effect a complete electrical contact around said bolt between the bolt and the cap, and electrical terminals within said box.

References Cited in the file of this patent

UNITED STATES PATENTS

| 739,707 | Park | Sept. 22, 1903 |
| 2,427,965 | Henderson | Sept. 23, 1947 |
| 2,440,279 | Larkins, Jr. | Apr. 27, 1948 |
| 2,469,474 | Perry | May 10, 1949 |
| 2,521,056 | Frei et al. | Sept. 5, 1950 |
| 2,532,538 | Burtt et al. | Dec. 5, 1950 |
| 2,563,712 | Frei et al. | Aug. 17, 1951 |
| 2,604,507 | Tyson | July 22, 1952 |

FOREIGN PATENTS

| 190,824 | Great Britain | Jan. 3, 1927 |
| 372,054 | Great Britain | May 5, 1932 |
| 451,302 | Great Britain | Aug. 4, 1936 |